(12) United States Patent
Fernandez (10) Patent No.: US 8,375,675 B1
(45) Date of Patent: Feb. 19, 2013

(54) TRUSS BEAM HAVING CONVEX-CURVED RODS, SHEAR WEB PANELS, AND SELF-ALIGNING ADAPTERS

(75) Inventor: Ian M. Fernandez, Boulder Creek, CA (US)

(73) Assignee: The United States of America as Represented by the Administrator of the National Aeronautics & Space Administration (NASA), Washington, DC (US)

( * ) Notice: Subject to any disclaimer, the term of this patent is extended or adjusted under 35 U.S.C. 154(b) by 714 days.

(21) Appl. No.: 12/574,493

(22) Filed: Oct. 6, 2009

(51) Int. Cl.
*E04H 12/10* (2006.01)
(52) U.S. Cl. .......................... 52/650.1; 52/843
(58) Field of Classification Search .................. 52/80.1, 52/80.2, 639, 644, 650.1, 656.9, 691, 843; 403/263, 267
See application file for complete search history.

(56) References Cited

U.S. PATENT DOCUMENTS

| | | | | |
|---|---|---|---|---|
| 1,298,927 A * | 4/1919 | Goiffon | ........................ | 52/691 |
| 1,656,810 A * | 1/1928 | Arnstein | ........................ | 52/634 |
| 2,415,240 A * | 2/1947 | Fouhy | ........................ | 52/745.08 |
| 2,612,854 A * | 10/1952 | Fuge | ........................ | 52/86 |
| 2,704,522 A * | 3/1955 | Frieder et al. | ................... | 52/641 |
| 3,283,464 A * | 11/1966 | Litzka | ........................ | 52/636 |
| 3,330,201 A * | 7/1967 | Mouton, Jr. | ..................... | 52/81.2 |
| 4,003,168 A * | 1/1977 | Brady | ........................ | 52/118 |
| 4,400,927 A * | 8/1983 | Wolde-Tinase | ............ | 52/745.08 |
| 4,557,097 A * | 12/1985 | Mikulas et al. | ................. | 52/646 |
| 4,729,605 A | 3/1988 | Imao et al. | | |
| 4,829,739 A * | 5/1989 | Coppa | ........................ | 52/745.2 |
| 4,924,638 A * | 5/1990 | Peter | ........................ | 52/86 |
| 4,932,807 A | 6/1990 | Rhodes | | |
| 5,052,848 A * | 10/1991 | Nakamura | ..................... | 403/268 |
| 5,350,221 A | 9/1994 | Pearce et al. | | |
| 5,560,174 A * | 10/1996 | Goto | ........................ | 52/655.1 |
| 5,575,129 A * | 11/1996 | Goto | ........................ | 52/655.1 |
| 5,655,347 A | 8/1997 | Mahieu | | |
| 5,704,169 A * | 1/1998 | Richter | ........................ | 52/81.2 |
| 6,374,445 B1 | 4/2002 | Fuessinger et al. | | |
| 6,446,292 B1 | 9/2002 | Fuessinger et al. | | |
| 7,347,030 B2 * | 3/2008 | Lewison | ........................ | 52/693 |
| 8,186,124 B2 * | 5/2012 | Bathon | ........................ | 52/701 |
| 2003/0177735 A1 * | 9/2003 | Seeba et al. | ................... | 52/726.2 |
| 2009/0142130 A1 * | 6/2009 | Frisch et al. | ................... | 403/267 |

* cited by examiner

*Primary Examiner* — Christine T Cajilig
(74) *Attorney, Agent, or Firm* — John F. Schipper; Robert M. Padilla (57) ABSTRACT

A truss beam comprised of a plurality of joined convex-curved rods with self-aligning adapters (SAA) adhesively attached at each end of the truss beam is disclosed. Shear web panels are attached to adjacent pairs of rods, providing buckling resistance for the truss beam. The rods are disposed adjacent to each other, centered around a common longitudinal axis, and oriented so that adjacent rod ends converge to at least one virtual convergence point on the common longitudinal axis, with the rods' curvature designed to increase prevent buckling for the truss beam. Each SAA has longitudinal bores that provide self-aligning of the rods in the SAA, the self-aligning feature enabling creation of strong adhesive bonds between each SAA and the rods. In certain embodiments of the present invention, pultruded unidirectional carbon fiber rods are coupled with carbon fiber shear web panels and metal SAA(s), resulting in a lightweight, low-cost but strong truss beam that is highly resistant to buckling.

20 Claims, 10 Drawing Sheets

TRUSS BEAM HAVING CONVEX-CURVED RODS, SHEAR WEB PANELS, AND SELF-ALIGNING ADAPTERS

CROSS-REFERENCE TO RELATED APPLICATIONS

Not Applicable

ORIGIN OF INVENTION

The invention described herein was made by (an) employee(s) of the United States Government and may be manufactured and used by or for the Government of the United States of America for governmental purposes without the payment of any royalties thereon or therefor.

BACKGROUND OF THE INVENTION

1) Field of the Invention

The present invention relates generally to a truss beam, and particularly to a truss beam comprised of rods, shear web panels, and self-aligning adapters.

Unidirectional fiber composite rods present an attractive option for structural members for use in applications requiring high strength and minimum weight, including but not limited to: spacecraft, aircraft (especially rigid airships), high performance ground vehicles, sports equipment (e.g. hang gliders), and tall architectural structures. To fully exploit the bending and compressive strengths of such assemblies composed of unidirectional fiber composite rods, one must provide for buckling stability.

The enormous strength of unidirectional fiber composite rods is difficult to fully exploit because of the difficulty in joining the rod ends to metal components. Bolting does not work with unidirectional composites, and bonding is difficult due to stiffness mismatches between the composite and metal components and the general lack of surface area per volume. Ideally, a thick bond is desired so that the relatively softer adhesive can shear and distribute shear stresses more uniformly instead of peaking at the ends of the bond. Thick bonds are difficult to obtain and repeatably control with conventional methods of beads, bonding wire, shim, or tooling. Most of these methods control the minimum thickness of the bond, but do not control the maximum thickness. In addition, traditional joint types such as lap, strap, scarf, etc. are not ideal for this purpose due to the non-planar nature of rods, fabrication costs, and strength issues.

2) Description of the Prior Art

U.S. Pat. No. 4,729,605 by Imao et al discloses a bicycle wheel spoke comprising a fiber reinforced plastic rod having metal parts adhesively bonded to the ends of the plastic rod, the plastic rod ends having been inserted into bores in the metal parts. U.S. Pat. No. 5,350,221 by Pearce et al discloses a wheel spoke comprising a fiber reinforced plastic shaft having metal end pieces adhesively bonded to the ends of the plastic shaft. U.S. Pat. No. 6,374,445 by Fuessinger et al discloses a tension rod for a chord for a bridge comprising a middle part made of a fiber composite material, the ends of which are glued to metallic end parts. U.S. Pat. No. 5,655,347 by Mahieu discloses a biarch framing member wherein at least one of the arches is made from a fiber reinforced polymer. U.S. Pat. No. 6,446,292 by Fuessinger et al discloses a mobile bridge utilizing composite fiber belts (for tensile forces) to which are attached shear ribs (for shear forces). U.S. Pat. No. 4,932,807 to Rhodes discloses an example of a clevis joint for use in a truss structure.

SUMMARY OF THE INVENTION

A truss beam comprised of a plurality of joined convex-curved rods ("rods"), shear web panels ("panels"), and one or more self-aligning adapters (SAA) disposed at each end of the truss beam, with each rod end being adhesively bonded to an SAA, is disclosed. Shear web panels are attached to adjacent pairs of rods, providing local buckling resistance for the rods, torsional buckling resistance, shear strength, and global stability of the truss beam. In various embodiments, shear web panels comprise face sheets, with a spacer layer disposed between and bonded to the face sheets to provide local buckling resistance. In various embodiments, the shear web panels have perforations to provide weight savings. The rods are disposed adjacent to each other and centered around a common longitudinal axis and oriented so that adjacent rod ends converge to virtual convergence points on the common longitudinal axis, with the rods' convex curvature designed to increase buckling resistance for the truss beam. The SAA(s) have longitudinal bores that provide self-aligning of the rods in the SAA(s), the self-aligning feature enabling creation of strong adhesive bonds between the SAA(s) and the rods. In various embodiments, the rods are fiber composite rods (filament wound or unidirectional), preferably pultruded carbon fiber rods. In various embodiments, the cross-sections of rods may be tubular, annular, solid, or combination of the foregoing. The cross-sectional shapes of the rods may be polygonal, elliptical (including circular, ellipsoid, and ovate), or combination of the foregoing. In various embodiments, an SAA comprises: an adhesive section and an adhesive injection bore. The adhesive section has a longitudinal bore to receive a rod. The longitudinal bore comprises an adhesive region and an alignment region. The adhesive region has a diameter sized relative to the diameter of the rod to provide an optimal radial spacing (between the inner surface of the adhesive region and the rod outer surface) for adhesive bonding. The adhesive injection bore enables adhesive to be inserted into the adhesive region. The diameter and depth of the alignment region is sized relative to the diameter of rod to provide a snug fit when the rod is passed through the adhesive region and seated in the alignment region. The snug fit maintains the rod in concentric alignment within the adhesive region. In some embodiments, the outer diameter of the SAA increases, preferably near the midpoint of the adhesive region, and continuing to increase as one proceeds along the longitudinal bore towards the alignment region. In various embodiments, the SAA(s) are comprised of materials having properties selected according to the following criteria: a) strength to weight ratio appropriate for the intended truss beam application; b) suitability for adhesive bonding to the rods.

DETAILED DESCRIPTION OF THE INVENTION

Figure 1A:
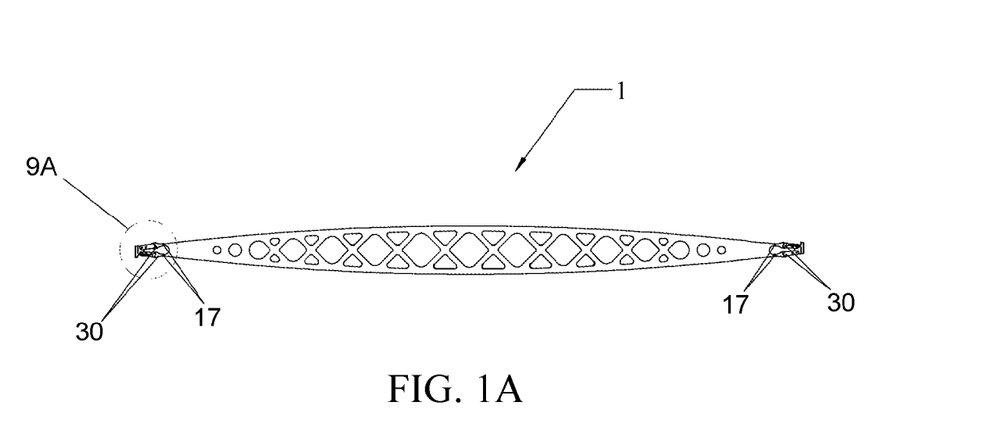
FIGS. 1A and 1B illustrate an embodiment of the truss beam of the present invention. In the figures, like or similar elements (such as truss beam 1) utilize the same reference characters throughout the various views.
Figure 1B:
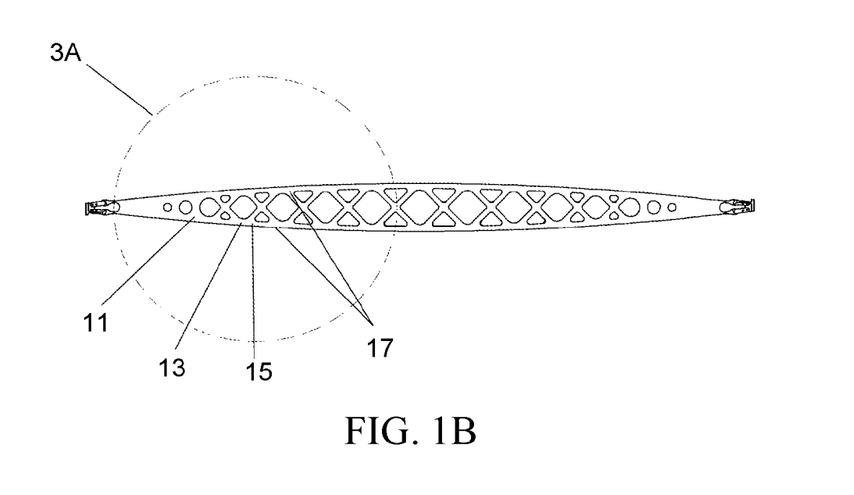

FIGS. 1A and 1B illustrate a truss beam embodiment of the present invention, comprising: a) at least three (three rods shown in the figure) convex-curved rods ("rods") 17 disposed adjacent to each other and centered around a common longitudinal axis; b) shear web panels ("panels") 11 bonded to adjacent pairs of rods 17, and c) at least one self-aligning adapter (SAA) 30 disposed at each end of the truss beam, with each rod end being adhesively bonded to an SAA to handle transfer of loads at the rod ends. In various embodiments, shear web panels comprise face sheets 13, with spacer layer 15 disposed between and bonded to the face sheets 13 to resist local buckling of the panel. In various embodiments, the rods 17 are fiber composite rods (filament wound or unidirectional), preferably pultruded carbon fiber rods. In various embodiments, the cross-sections of rods 17 may be tubular, annular, solid, or combination of the foregoing. The cross-sectional shapes of rods 17 may be polygonal, elliptical (including circular, ellipsoid, and ovate), or combination of the foregoing. In various embodiments, the SAA(s) are comprised of materials having properties selected according to the following criteria: a) strength to weight ratio appropriate for the intended truss beam application; b) suitability for adhesive bonding to the rods. In preferred embodiments, the rods are fiber composite, and the SAA(s) are metal.

Figures 2A, 2B, 2C, 2D:
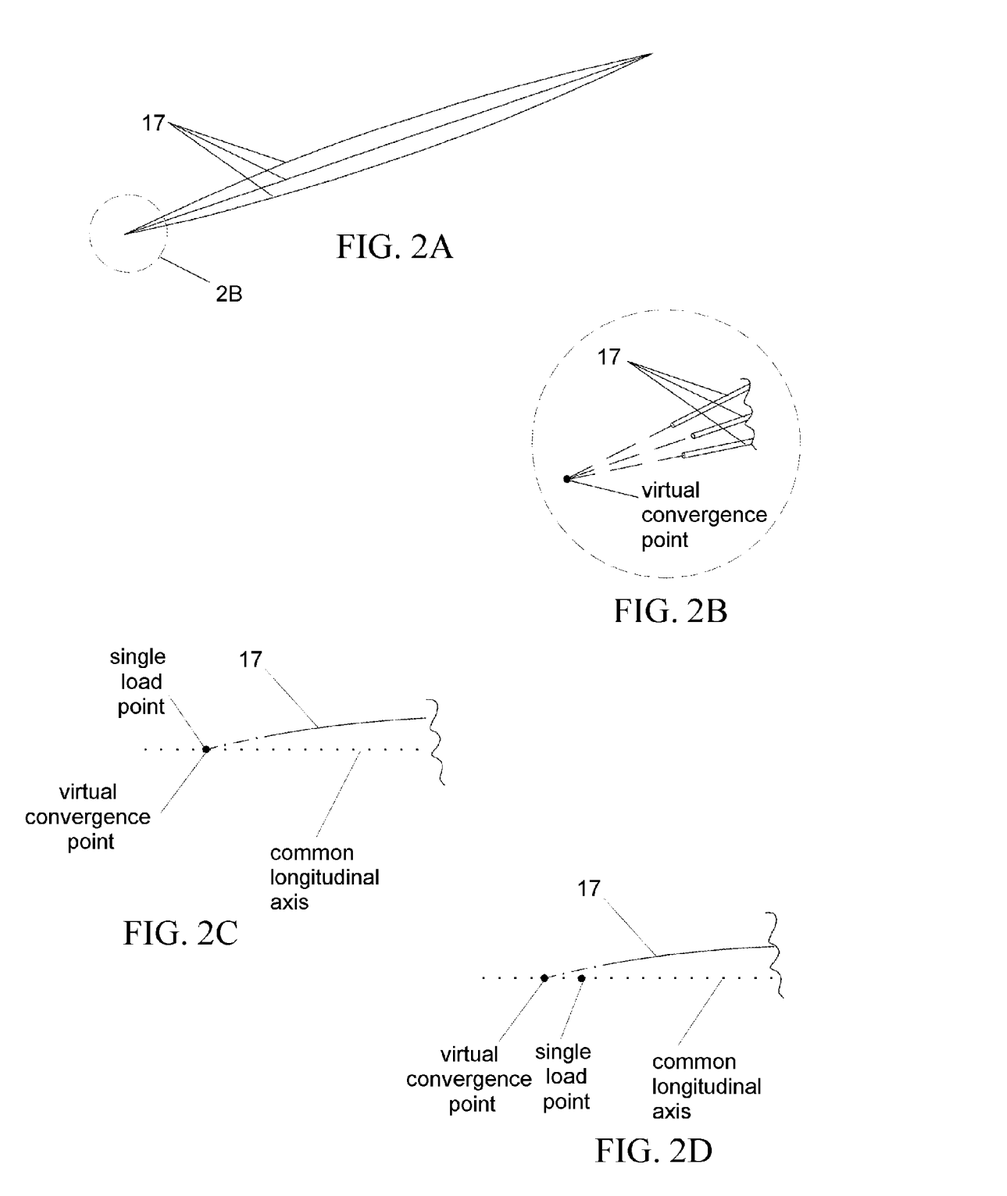
FIGS. 2A to 2D illustrate various aspects of embodiments of the present invention with respect to the convex curvature of the rods, and convergence of the rod ends to common points on the common longitudinal axis.

FIGS. 2A to 2D illustrate various aspects of embodiments of the present invention with respect to the convex curvature of the rods 17, and the convergence of the ends of the rods 17 to virtual convergence points on the common longitudinal axis. Convex-curved rods 17 transfer loads directly from node point to node point, with the rods' convex curvature designed to increase mid span section properties of the truss beam thereby providing resistance to overall buckling of the truss beam 1. The amount of convex curvature may be selected by means well known in the art (e.g. Euler's buckling theory for columns), taking into consideration the desired span, expected loads, the truss beam cross-section, and material properties of the components being used. As shown in FIG. 2A, the rods 17 are disposed adjacent to each other and centered around a common longitudinal axis, with the fibers in the rods 17 being disposed in the same local direction as the rods. As illustrated in FIG. 2B, the rods 17 are oriented so that the adjacent ends of the rods 17 converge to a virtual convergence point on the common longitudinal axis. In various embodiments of the present invention, at each end of the truss beam 1 the loads from each of the rods 17 are combined to a single load point (point from which the combined load may be transferred to component(s) separate from the truss beam 1). In various embodiments, as shown in FIG. 2C, the virtual convergence points coincide with the single load points. In various embodiments, as shown in FIG. 2D, the virtual convergence points are spaced a distance outward from the single load points, providing increased torsional buckling resistance. In further embodiments, the virtual convergence points are spaced a distance equal to 10 percent of the length of the truss beam 1. In embodiments of the present invention, the number of rods 17 is equal to or greater than three. A single fiber composite rod has little resistance to buckling. Two fiber composite rods, even if joined by a shear web panel would still be susceptible to side buckling. For numbers of rods 17 greater than three, without additional bracing, the cross-sectional stability of the rods 17 and shear web panels 11 combination may be difficult to maintain (in manufacture and/or in use). For example, it may be difficult to prevent four rods 17 in a square configuration from buckling to non-orthogonal parallelogram shapes.

Figure 3A:
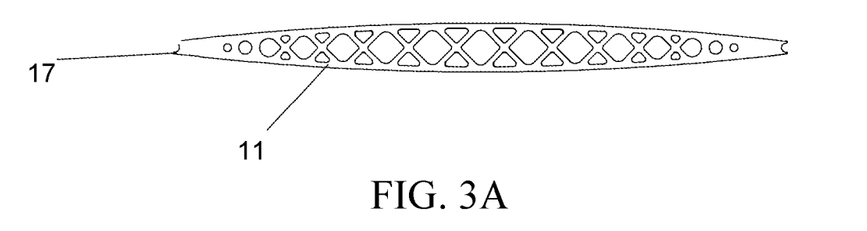
FIGS. 3A to 3C illustrate various aspects of an embodiment of the present invention, with respect to exemplary shear web panels connecting adjacent pairs of rods.
Figure 3B:
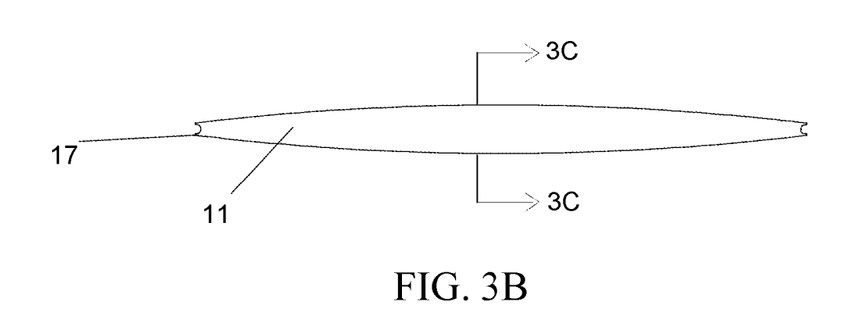
Figure 3C:
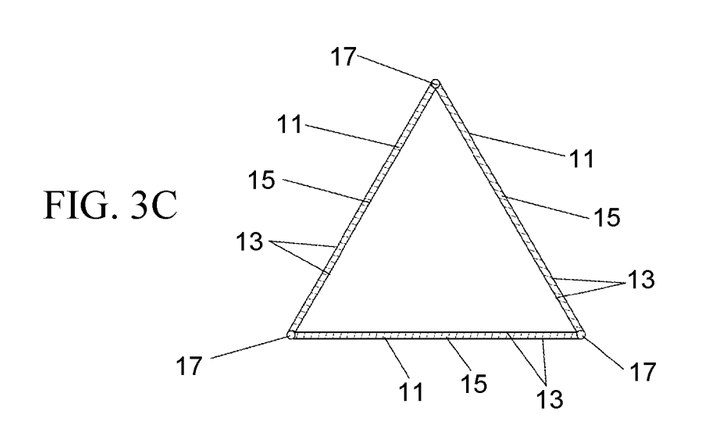

FIGS. 3A to 3C illustrate various aspects of an embodiment of the present invention, with respect to exemplary shear web panels 11 connecting adjacent pairs of rods 17. In various embodiments, the shear web panels have perforations to enable savings in weight of the truss beam. FIG. 3A provides a side view of a shear web panel 11 with exemplary perforations, the perforations having a common X pattern (typical for the majority of the shear web panel) that transitions to a series of circles as one approaches each end of the truss beam. In various embodiments, the shear web panels do not have perforations (e.g. FIG. 3B), since such panels would cost less (elimination of manufacturing costs associated with the perforations). FIG. 3C illustrates a cross-sectional view of an exemplary shear web panel 11. In various embodiments, the shear web panels comprise two face sheets 13 FIG. 1B, of material having high strength to weight ratio and high strength in several directions for overall buckling resistance and a spacer layer 15, disposed between and bonded to the face sheets 13 to provide local buckling resistance. Face sheets 13 and spacer layer 15 may be bonded to each other by means well known in the art. In various embodiments, face sheets 13 are fiber composite sheets, preferably carbon fiber sheets, more preferably ±45 carbon fiber (±45 being the orientation of the fibers relative to the longitudinal beam axis). In various embodiments, spacer layer 15 is a honeycomb material (for weight savings), preferably an aromatic polyamide honeycomb, more preferably a meta-aramid honeycomb. The shear web panels 11 may be bonded to rods 17 by means well known in the art.

Figure 4A:
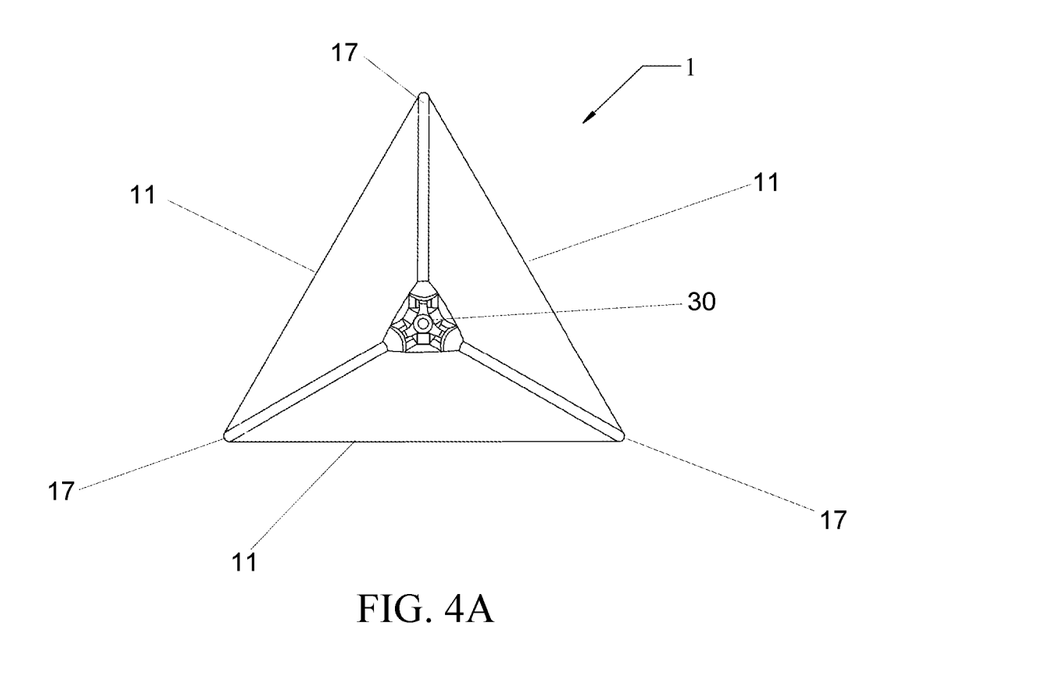
FIGS. 4A and 4B provide end views of a truss beam embodiment of the present invention.
Figure 4B:
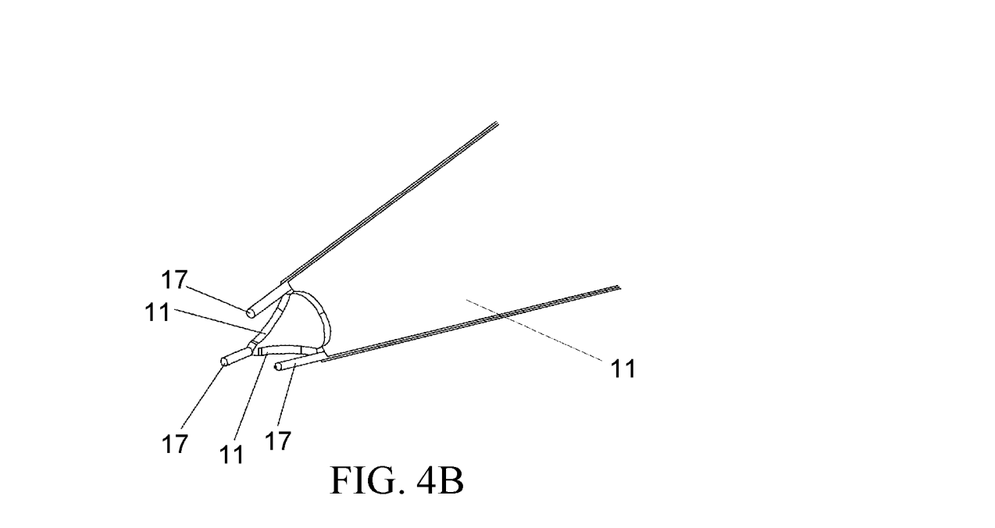

FIGS. 4A and 4B provide end views of a truss beam embodiment of the present invention. FIG. 4A provides an end view of a truss beam 1 embodiment having: three rods 17, shear web panels 11 (no perforations) bonded to adjacent pairs of rods 17, and self-aligning adapter 30 adhesively bonded to the ends of rods 17. FIG. 4B provides a perspective view of one end of the same truss beam 1 embodiment, with the self-aligning adapter 30 removed to show the ends of rods 17.

Figure 5:
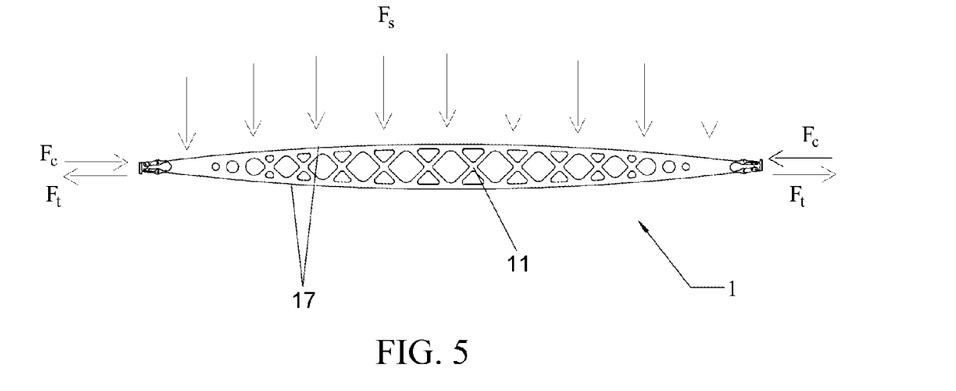
FIG. 5 illustrates various forces exerted on a truss beam embodiment of the present invention.

FIG. 5 illustrates an embodiment of the present invention with respect to various forces exerted on the truss beam 1. The truss beam 1 can be expected to experience tensile, compressive, and side forces. The tensile and compressive forces would be primarily borne by the rods 17, while the side forces would be further borne by the shear web panels 11.

Figure 6A:
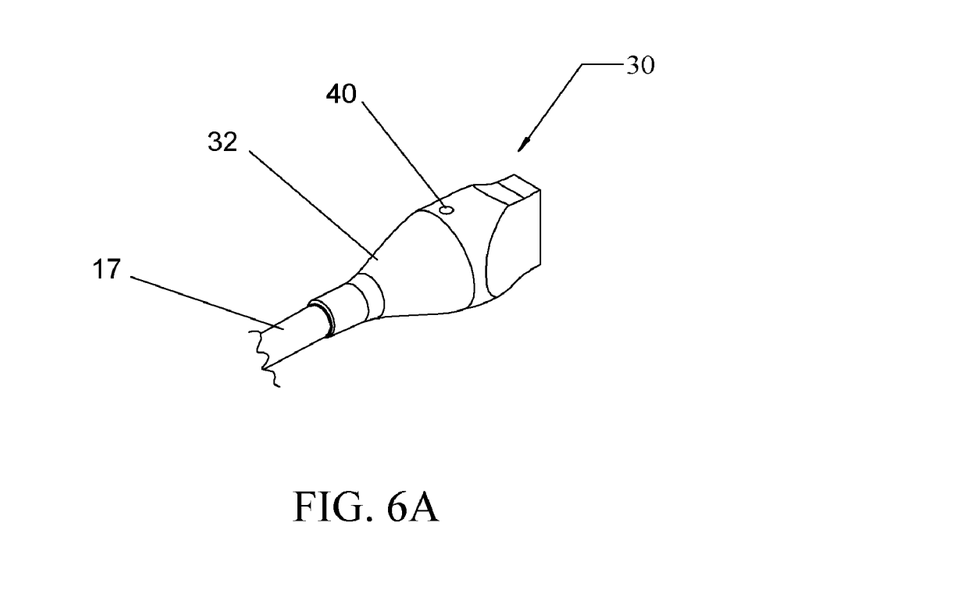
FIGS. 6A and 6B provide perspective views to illustrate various aspects of embodiments of a self-aligning adapter (SAA) of the present invention.
Figure 6B:
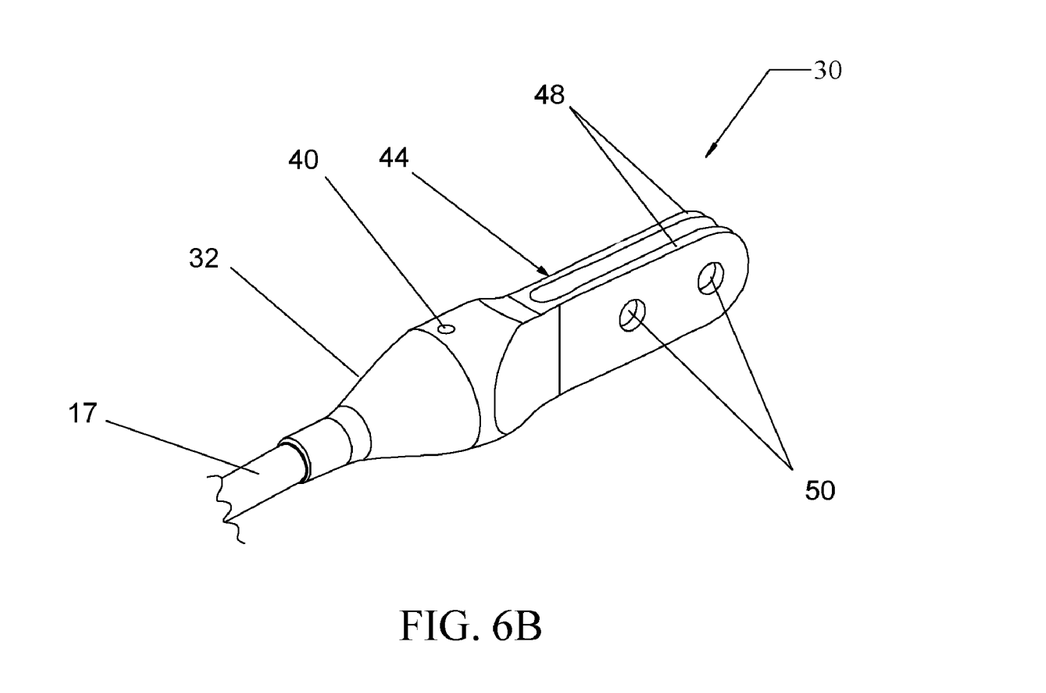

FIGS. 6A and 6B provide perspective views to illustrate various aspects of embodiments of a self-aligning adapter (SAA) 30 of the present invention. As shown in FIG. 6A, the end of rod 17 is received in the adhesive section 32 of SAA 30. Adhesive section 32 has an adhesive injection bore 40 enabling adhesive (not shown) to be injected into adhesive section 32 to adhesively bond rod 17 to SAA 30. In various embodiments, an SAA would have a section enabling mechanical engagement with (by means well known in the art) other components. As shown in FIG. 6B, SAA 30 further comprises a clevis joint section 44. The clevis joint section comprises a U-shaped shackle with two protruding lugs 48. Each lug has at least two transverse bores 50 (two bores shown in the figure) for bolting to a typical mechanical interface (such as would be well known in the art) of another component.

Figure 7A:
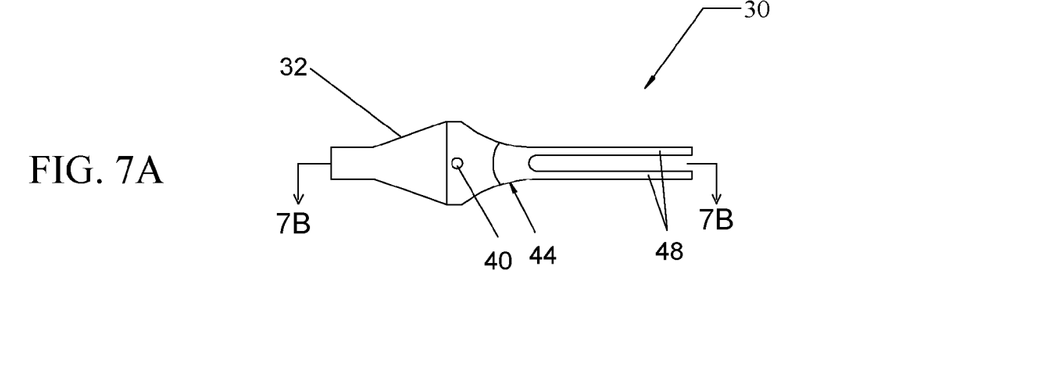
FIGS. 7A to 7C provide side and cutaway views to illustrate various aspects of an embodiment of a self-aligning adapter of the present invention.
Figure 7B:
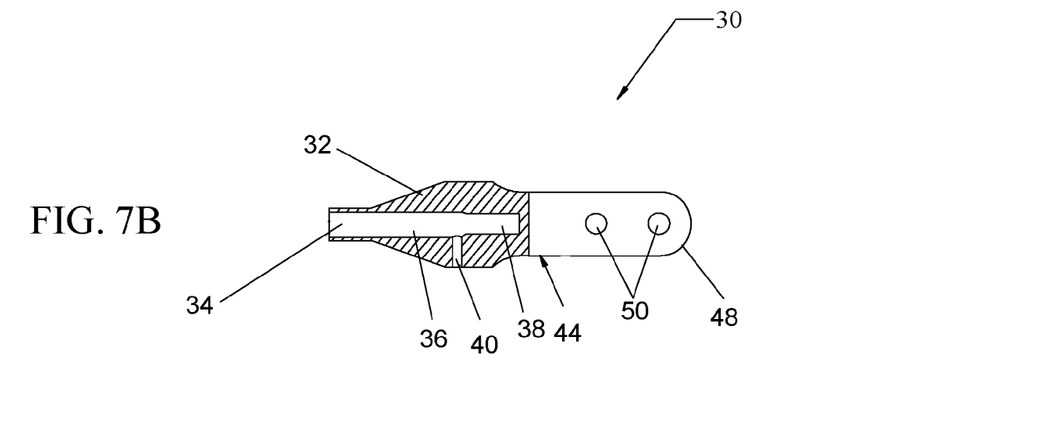
Figure 7C:
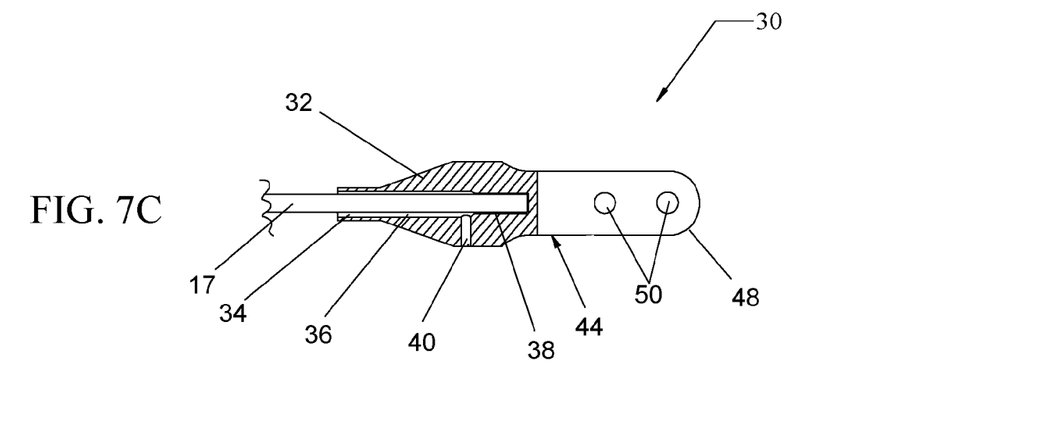

FIGS. 7A to 7C provide side and cutaway views to illustrate various aspects of an embodiment of a self-aligning adapter (SAA) 30 of the present invention. As shown in FIG. 7A, SAA 30 comprises: adhesive section 32, adhesive injection bore 40, and clevis joint section 44. Clevis joint section comprises a U-shaped shackle with two protruding lugs 48. As can be seen in cutaway views FIGS. 7B and 7C, adhesive section 32 has a longitudinal bore 34 to receive rod 17. Longitudinal bore 34 comprises adhesive region 36 and alignment region 38. Adhesive region 36 has a diameter sized relative to the diameter of rod 17 to provide an optimal radial spacing (between the inner surface of the adhesive region and the rod outer surface) for adhesive bonding. Adhesive injection bore 40 provides fluid communication between adhesive region 36 and the exterior of SAA 30, enabling adhesive (not shown) to be inserted into adhesive region 36. The diameter and depth of alignment region 38 is sized relative to the diameter of rod 17 to provide a snug fit when rod 17 is passed through adhesive region 36 and seated in alignment region 38. The snug fit maintains rod 17 in concentric alignment within adhesive region 36. Thus, adhesive region 36 and alignment region 38 of longitudinal bore 34 provide a capability for self-alignment of rod 17 with SAA 30. In preferred embodiments, adhesive injection bore 40 is located near the transition between adhesive region 36 and alignment region 38. The adhesive to be used may be selected from among those well known in the art that are appropriate for the particular application.

Figure 8A:
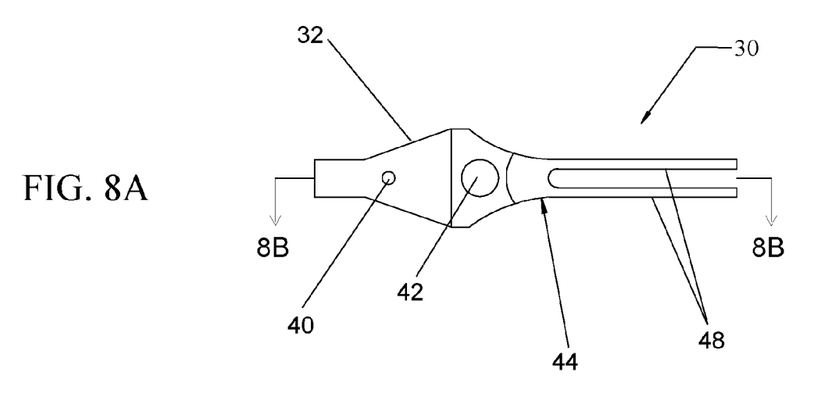
FIGS. 8A and 8B provide side and cutaway views to illustrate various aspects of an embodiment of a self-aligning adapter of the present invention.
Figure 8B:
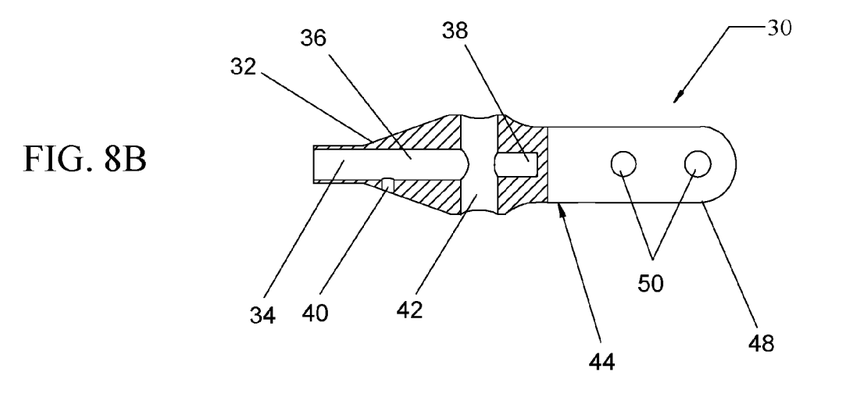

FIGS. 8A and 8B provide side and cutaway views to illustrate various aspects of an embodiment of a self-aligning adapter (SAA) 30 of the present invention. As shown in FIGS. 8A and 8B, SAA 30 comprises: adhesive section 32, adhesive injection bore 40, inspection bore 42, and clevis joint section 44. Clevis joint section comprises a U-shaped shackle with two protruding lugs 48. Protruding lugs 48 have transverse bores 50 (two shown in the figure). Adhesive section 32 has a longitudinal bore 34 to receive rod 17 (not shown). Longitudinal bore 34 comprises adhesive region 36 and alignment region 38. Adhesive region 36 has a diameter sized relative to the diameter of rod 17 to provide an optimal radial spacing (between the inner surface of the adhesive region and the rod outer surface) for adhesive bonding. Adhesive injection bore 40 provides fluid communication between adhesive region 36 and the exterior of SAA 30, enabling adhesive (not shown) to be inserted into adhesive region 36. The diameter and depth of alignment region 38 is sized relative to the diameter of rod 17 to provide a snug fit when rod 17 is passed through adhesive region 36 and seated in alignment region 38. The snug fit maintains rod 17 in concentric alignment within adhesive region 36. Thus, adhesive region 36 and alignment region 38 of longitudinal bore 34 provide a capability for self-alignment of rod 17 with SAA 30. Maintenance of rod 17 in concentric alignment obviates the need for conventional bond line control methods (e.g. beads, wire, or mesh) which are typically used (albeit imperfectly) to maintain the proper minimum gap spacing between pieces being bonded. In addition, these conventional bond line control methods do not provide a means to control the maximum gap spacing (a parameter which is also important for optimum bond strength), and are not ideal for cylindrical bonding. Inspection bore 42 (connecting to longitudinal bore 34 and preferably disposed between the adhesive region 36 and the alignment region 36), provides the capability to: a) verify that rod 17 is properly seated in the alignment region 38; b) verify that sufficient adhesive has been inserted into adhesive region 36; and c) any combination of the foregoing. In some embodiments, the outer diameter of SAA 30 increases, preferably near the midpoint of adhesive region 36, and continues to increase as one proceeds along longitudinal bore 34 towards alignment region 38. In a typical adhesive bond, peak stresses are focused more towards each end of the bond, less so at the middle of the bond. By increasing the diameter of the SAA 30, more of the load is distributed to the middle of the bond, not just at the bond ends. The point at which the SAA diameter begins to increase creates a stress concentration; the resulting increased stress causes metal SAA(s) to yield (with eventual strain hardening) before the adhesive fails. Thus, more effective matching of the SAA 30 material's stiffness to the rod 17 material's stiffness is achieved.

Figure 9A:
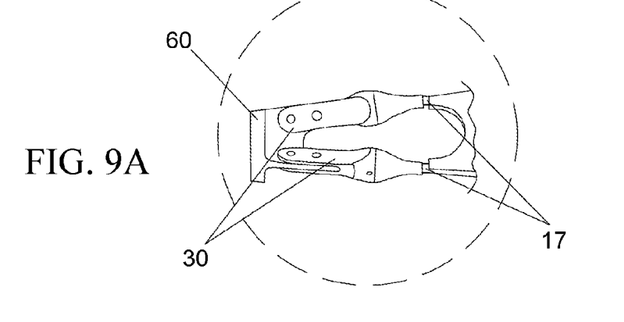
FIGS. 9A to 9F provide views to illustrate various aspects of embodiments of the present invention with respect to combining of loads from rods to single load points.
Figure 9B:
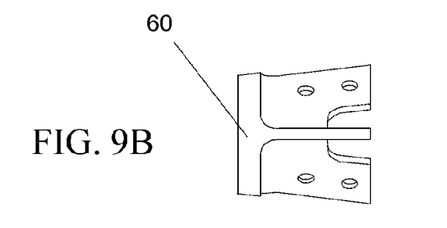
Figure 9C:
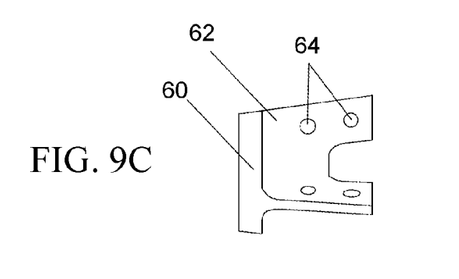
Figure 9D:
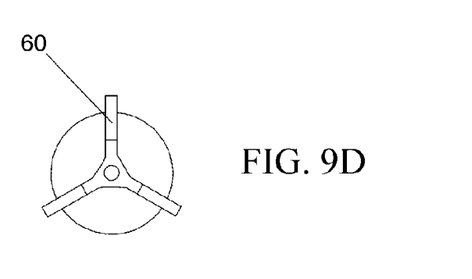
Figure 9E:
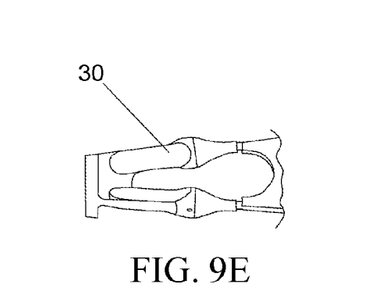
Figure 9F:
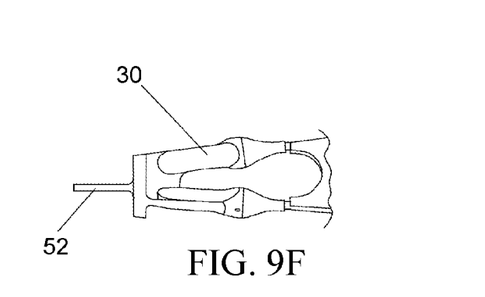

FIGS. 9A to 9F provide views to illustrate various aspects of embodiments of the present invention with respect to combining loads from rods 17 to single load points. As mentioned with respect to FIGS. 2A to 2D, at each end of truss beam 1 loads from rods 17 are combined to a single load point (point from which the combined load from the rods 17 may be transferred to a component separate from the truss beam 1). Referring to FIG. 9A, an SAA 30 is attached to each rod 17. Load bearing fitting (LBF) 60 is adapted to mechanically couple with multiple SAA(s) 30 (in FIGS. 9A to 9D LBF 60 is configured to couple to three SAA(s) 30), providing a single load point for the loads from the coupled SAA(s) 30. In FIGS. 9A (perspective), 9B (top view), 9C (side view), and 9D (end view), mechanical coupling is exemplified via a clevis joint arrangement, wherein LBF 60 has three protruding tangs 62 (with transverse bores 64) to engage with SAA(s) 30 (as exemplified by SAA 30 shown in FIG. 6B). Each tang 62 has the corresponding number of transverse bores 64 to match the bores 50 in the SAA lugs 48 that the LBF 60 couples with. Secure engagement of LBF 60 to SAA(s) 30 occurs via clevis joint securing members (bolts or pins) (not shown in the figures) disposed within the LBF tang bores 64 and SAA lug bores 50. In FIG. 9E, SAA 30 has multiple adhesive sections (each receiving a rod 17), the SAA 30 itself providing a single load point for the rods 17 it is bonded to. In FIG. 9F, SAA 30 has a protruding lug 52 enabling mechanical coupling to a component external to the truss beam.

Figure 10A:
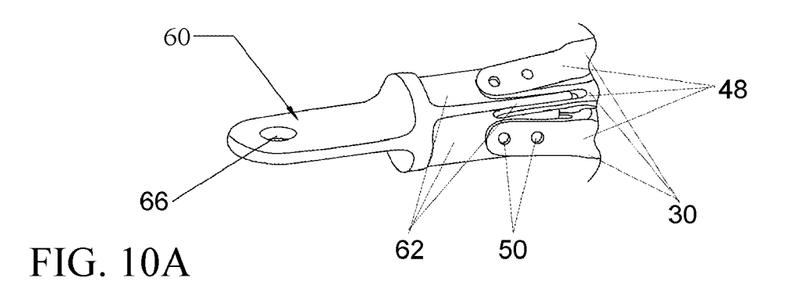
FIGS. 10A to 10C provide views to illustrate various aspects of embodiments of the present invention with respect to combining of loads from rods to single load points.
Figure 10B:
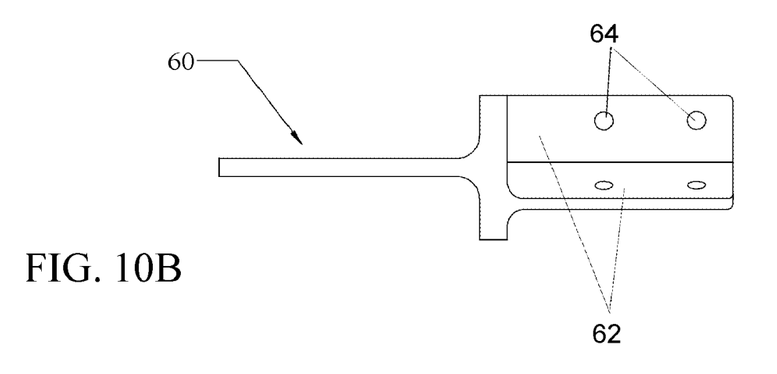
Figure 10C:
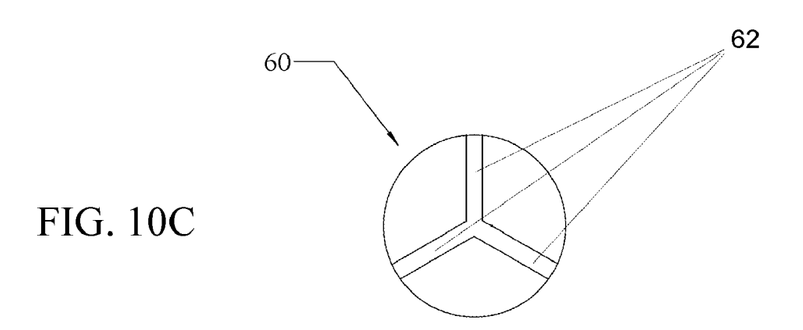

FIGS. 10A (perspective), 10B (side view) and 10C (end view) provide views to illustrate various aspects of another embodiment of an LBF 60. Analogous to LBF 60 described in FIGS. 9A to 9D, LBF 60 has protruding tangs 62 (with transverse bore 64), and mechanically couples to SAA(s) 30 in a clevis joint arrangement. LBF 60 provides a single load point for the loads from the coupled SAA(s). LBF 60 further has a protruding tang 66 enabling mechanical coupling a component external to the truss beam.

EXAMPLE

Shear web panels were constructed using: face sheets of two ply ±45 carbon fiber, with a 3/16" thick 1.5 lbs/ft3 Nomex honeycomb spacer layer disposed between and adhesively (syntactic epoxy) bonded to the face sheets. The shear web panels were fabricated flat and curved to match three twelve foot, ¼" diameter pultruded carbon fiber rods, each having convex curvature of 172 degrees of arc. The rods were adhesively bonded (epoxy) to the shear web panels (a pair of rods for each panel). Self-aligning adapters (SAA) were fabricated from aluminum alloy 1" round, 0.1 lbs per SAA and adhesively bonded (Hysol EA 9360 epoxy injection) to each rod end.

Obviously numerous modifications and variations of the present invention are possible in the light of the above teachings. It is therefore to be understood that within the scope of the appended claims the invention may be practiced otherwise than as specifically described therein.

What is claimed is:

1. A truss beam comprising:
    at least three convex-curved fiber composite rods disposed adjacent to each other and centered around a common longitudinal axis, the rods' convex curvature being selected to increase buckling resistance of the truss beam, said rods being oriented so that adjacent rod ends on each side of said truss beam converge to virtual convergence points on said common longitudinal axis;
    a shear web panel bonded to each adjacent pair of said rods, each said panel acting to stabilize said rods and carry side loads, each said panel comprising: two face sheets of high strength to weight ratio material with a layer of spacer material disposed between and bonded to said face sheets to resist local buckling of said panel;
    one or more self-aligning adapters disposed at each end of the truss beam, with each rod end being adhesively bonded to a self-aligning adapter, said self-aligning adapters each having:
        a longitudinal bore to receive said rod end, said longitudinal bore having an adhesive region and an alignment region, the diameter of said adhesive region sized relative to the received rod diameter to provide an optimal radial spacing between the inner surface of the adhesive region and the rod outer surface for adhesive bonding, the diameter and depth of said alignment bore sized to provide a snug fit when the received rod passes through the adhesive region and is seated in the alignment region, thereby maintaining said received rod in concentric alignment within said adhesive region, and an
        adhesive injection bore providing fluid communication between said adhesive region and the exterior of the self-aligning adapter enabling adhesive to be injected into said adhesive region.

2. The truss beam of claim 1 wherein:
the number of said rods is three.

3. The truss beam of claim 1 wherein:
said rods are selected from the list of rods consisting of unidirectional, filament wound, and any combination of the foregoing; and
the cross-sections of said rods are selected from the list consisting of tubular, annular, solid, and any combination of the foregoing.

4. The truss beam of claim 3 wherein:
said rods are pultruded unidirectional circular solid cross-section carbon fiber rods.

5. The truss beam of claim 1 wherein:
the outer diameter of said self-aligning adapter is tapered along the longitudinal axis.

6. The truss beam of claim 1 wherein:
said shear web face sheets are comprised of fiber composite material, and said spacer layer is comprised of a honeycomb material.

7. The truss beam of claim 6 wherein:
said fiber composite material is a carbon fiber material, and said honeycomb material is a aromatic polyamide honeycomb material.

8. The truss beam of claim 1 wherein:
said self-aligning adapter further comprises:
    an inspection bore connecting to said longitudinal bore and disposed between said adhesive region and alignment region, providing the capability to:
    a) verify that the received rod is properly seated in the alignment region,
    b) verify that sufficient adhesive has been inserted into the adhesive region, and
    c) any combination of the foregoing.

9. The truss beam of claim 1 wherein:
said shear web panels have transverse perforations.

10. The truss beam of claim 9 wherein:
said shear web panels do not have perforations in the last 10 percent of the panel length region adjacent to the rod ends on each end of the truss beam.

11. The truss beam of claim 1 further comprising:
a single load point at each end of said truss beam, said single load points comprising points from which the combined load from the rods may be transferred to component(s) separate from the truss beam.

12. The truss beam of claim 11 wherein:
said single load points are coincident with said virtual convergence points.

13. The truss beam of claim 11 wherein:
said virtual convergence points are a distance outward along said common longitudinal axis from said single load points.

14. The truss beam of claim 13 wherein:
said distance outward is 10 percent of the length of the truss beam.

15. The truss beam of claim 11 wherein:
said single load points are represented by components selected from the list consisting of:
a) a load bearing fitting being mechanically coupled to multiple self-aligning adapters, each self-aligning adapter having a single adhesive section with which to receive a rod;
b) a self-aligning adapter having an adhesive section configured for receiving a rod; and
c) any combination of the foregoing.

16. The truss beam of claim 15 wherein:
said single adhesive section self-aligning adapters each have a clevis joint section comprised of a U-shaped shackle section of two protruding lugs having transverse bores;
said load bearing fitting has protruding tangs;
and said mechanical coupling comprising said load bearing fitting tangs engaging with the single adhesive section self-aligning adapters' U-shaped shackle sections in a clevis joint arrangement.

17. The truss beam of claim 1 wherein:
said self-aligning adapters are comprised of materials having properties selected according to the following criteria:
a) strength to weight ratio appropriate for the intended truss beam application;
b) suitability for adhesive bonding to the rods.

18. The truss beam of claim 17 wherein:
said self-aligning adapters are comprised of metal.

19. A truss beam comprising:
three convex-curved circular cross-section pultruded unidirectional carbon fiber rods disposed adjacent to each other and centered around a common longitudinal axis, the rods' convex curvature being selected to increase buckling stability of the truss beam, said rods being oriented so that adjacent rod ends on each side of said truss beam converge to virtual convergence points near single load points on said common longitudinal axis, said single load points comprising points from which the combined load from the rods may be transferred to component(s) separate from the truss beam;
a shear web panel attached to each adjacent pair of said rods, each said panel acting to stabilize said rods and carry side loads, each said panel comprising: two face sheets of carbon fiber material with a layer of aromatic polyamide honeycomb spacer material disposed between and bonded to said face sheets to resist local buckling of said panel;
one or more metal self-aligning adapters disposed at each end of the truss beam, with each rod end being adhesively bonded to a self-aligning adapter, said self-aligning adapters each having:
a longitudinal bore to receive said rod end, said longitudinal bore having an adhesive region and an alignment region, the diameter of said adhesive region sized relative to the received rod diameter to provide an optimal radial spacing between the inner surface of the adhesive region and the rod outer surface for adhesive bonding, the diameter and depth of said alignment bore sized relative to the received rod diameter to provide a snug fit when the received rod passes through the adhesive region and is seated in the alignment region, thereby maintaining said received rod in concentric alignment within said longitudinal bore;
an adhesive injection bore providing fluid communication between said adhesive region and the exterior of the self-aligning adapter enabling adhesive to be injected into said adhesive region; and
an inspection bore connecting to said longitudinal bore and disposed between said adhesive region and alignment region.

20. The truss beam of claim 19 wherein:
the outer diameter of said self-aligning adapter is tapered along the longitudinal axis.

* * * * *